United States Patent [19]
Nakazawa

[11] Patent Number: 5,315,605
[45] Date of Patent: May 24, 1994

[54] ION LASER APPARATUS
[75] Inventor: Yoshio Nakazawa, Tokyo, Japan
[73] Assignee: NEC Corporation, Japan
[21] Appl. No.: 3,272
[22] Filed: Jan. 12, 1993
[30] Foreign Application Priority Data
  Jan. 24, 1992 [JP] Japan ................... 4-034286
[51] Int. Cl.5 ............................................. H01S 3/04
[52] U.S. Cl. ......................................... 372/34; 372/35;
                                                 372/61; 372/65; 372/82
[58] Field of Search .................... 372/35, 34, 61, 62,
                                                 372/65, 82

[56] References Cited
U.S. PATENT DOCUMENTS

| | | | |
|---|---|---|---|
| 4,625,317 | 11/1986 | Kolb et al. | 372/61 |
| 4,672,622 | 6/1987 | Gürs et al. | 372/58 |
| 4,752,936 | 6/1988 | Gerhardt | 372/62 |
| 4,841,539 | 6/1989 | Hahn et al. | 372/61 |
| 4,847,852 | 7/1989 | Yatsn et al. | 372/82 |

FOREIGN PATENT DOCUMENTS
58-213486 12/1983 Japan.

Primary Examiner—Léon Scott, Jr.
Attorney, Agent, or Firm—Laff, Whitesel, Conte, Saret

[57] ABSTRACT

An ion laser apparatus includes an ion laser tube, a pipe member, and air cooling heat radiating fins. The ion laser tube base a laser capillary having a discharge path between an anode and a hot cathode and a feedback path for an internal gas. The pipe member constitutes a cooling liquid channel for causing a cooling liquid to flow in an outer peripheral portion of the laser capillary. The air cooling heat radiation fins directly radiate heat, which is generated by the laser capillary, without being through the cooling liquid.

4 Claims, 3 Drawing Sheets

ION LASER APPARATUS

BACKGROUND OF THE INVENTION

The present invention relates to an ion laser apparatus and, more particularly, to an ion laser apparatus having an improved cooling structure for a laser capillary.

As conventional methods of cooling an ion laser apparatus, an air cooling method and a water cooling method are known.

FIG. 3 shows a conventional air-cooled ion laser apparatus, and FIG. 4 shows a conventional water-cooled ion laser apparatus.

In FIGS. 3 and 4, reference numeral 1 denotes a laser capillary consisting of BeO. A discharge path 2 is formed at the center of the laser capillary 1, a feedback path 3 for a laser medium such as an argon gas is formed around the laser capillary 1, and a metallized layer 4 is formed on the outer surface of the laser capillary 1. Reference numerals 5a and 5b denote a pair of laser mirrors; 6, a hot cathode arranged in a cathode bulb 7 consisting of stainless; 8, an anode; 9 (FIG. 3), heat radiation fins brazed on the laser capillary 1 by the metallized layer 4; and 10, a pipe, having cooling water inlet and outlet ports 11 and 12 and brazed on the laser capillary by the metallized layer 4, for causing cooling water to flow around the laser capillary 1.

In a laser apparatus using the laser tube shown in FIG. 3, an air cooling fan (not shown) for cooling the heat radiation fins is used. In addition, when a water cooling method is used, a cooling unit (not shown) for cooling water and a cooling water circulating system (not shown) are required.

In the above conventional air-cooled ion laser apparatus, hot air is blown by causing the air cooling fan to cool the cooling fins, and the hot air cannot be easily handled depending on applications of the ion laser apparatus. Since the vibration of the air cooling fan is transmitted to the laser apparatus to vibrate the laser tube, the position of the laser beam emitted from the laser apparatus is vibrated in synchronization with the vibration of the laser apparatus. In addition, unlike in the air cooling method, although a water cooling method does not have the above problems, i.e., the handling of hot air and the vibration of the fan, the water cooling method has the following drawback. That is, the water cooling method requires a cooling unit for cooling water and a cooling water circulating system, thereby increasing the size of the water cooling unit.

As described above, since the conventional air- and water-cooled ion laser apparatuses have advantageous and drawbacks, they are selectively used according to their application purposes. However, in experiments or the like, since two ion laser apparatuses, i.e., air- and water-cooled ion laser apparatuses must be prepared, a large investment in equipment is required.

In addition, two types, i.e., air- and water-cooled laser apparatuses must be manufactured in manufacturers, and both the types of lasers are expensive.

In order to solve the above problems, as disclosed in Japanese Patent Laid-Open No. 58-213486, the following ion laser tube is proposed. In the laser ion laser tube, after heat generated by a laser capillary is temporarily absorbed in a cooling liquid in a pipe, the heat absorbed in the cooling liquid is radiated through heat radiation fins arranged on the outer peripheral portion of the pipe. However, since the laser capillary is cooled with air through the cooling liquid, a high cooling efficiency cannot be obtained. In addition, a water cooling method or an air cooling method cannot independently used.

SUMMARY OF THE INVENTION

It is an object of the present invention to provide an ion laser apparatus capable of arbitrarily selecting a cooling method from an air cooling method and a water cooling method.

It is another object of the present invention to provide an ion laser apparatus capable of decreasing production cost and maintenance cost.

It is still another object of the present invention to provide an ion laser apparatus capable of increasing a cooling efficiency to obtain a high-output laser beam.

In order to achieve the above objects, according to the present invention, there is provided an ion laser apparatus comprising an ion laser tube having a laser capillary having a discharge path between an anode and a hot cathode and a feedback path for an internal gas, a pipe member for constituting a cooling liquid channel for causing a cooling liquid to flow in an outer peripheral portion of the laser capillary, and air-cooled heat radiation fins for directly radiating heat, which is generated by the laser capillary, without being through the cooling liquid.

DESCRIPTION OF THE PREFERRED EMBODIMENTS

Embodiments of the present invention will be described below with reference to the accompanying drawings.

Figure 1A:
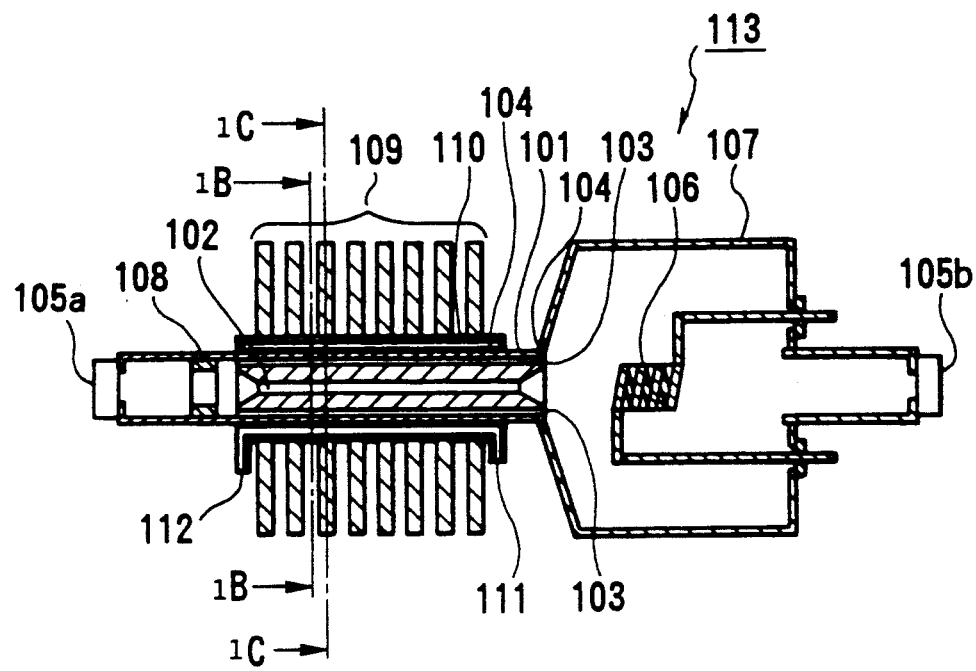
FIG. 1A is a sectional view showing an ion laser apparatus according to the first embodiment of the present invention.
Figure 1B:
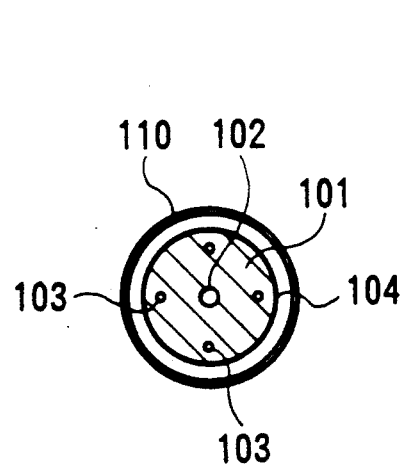
FIG. 1B is a sectional view showing the ion laser apparatus along a line in 1B—1B in FIG. 1A.
Figure 1C:
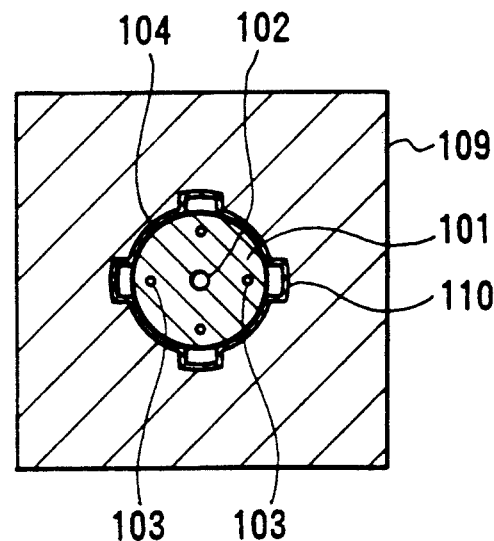
FIG. 1C is a sectional view showing the ion laser apparatus along a line 1C—1C in FIG. 1A.

FIG. 1A shows an ion laser apparatus according to the first embodiment of the present invention, FIGS. 1B shows the ion laser apparatus along a line 1B—1B in FIG. 1A, and FIG. 1C shows the ion laser apparatus along a line 1C—1C in FIG. 1A.

In FIGS. 1A, 1B, and 1C, reference numeral 101 denotes a laser capillary consisting of BeO; 102, a discharge path formed at the center of the laser capillary 101; 103, a feedback path, arranged around the discharge path 102, for a laser medium such as an argon gas; 104, a metallized layer formed on the outer surface of the laser capillary 101; 105a and 105b, a pair of opposite laser mirrors arranged on the optical axis of the laser capillary 101; 106, a hot cathode; 107, a stainless cathode bulb which is fixed to one end portion of the laser capillary 101 and in which the hot cathode 106 is arranged; and 108, an anode, arranged to the other end portion of the laser capillary 101, for performing discharge to the hot cathode 106 in a gas atmosphere. These parts constitute an internal mirror ion laser tube 113. Note that the pair of laser mirrors 105a and 105b are arranged outside the hot cathode 106 and the anode 108.

Reference numeral 110 denotes a copper pipe, brazed on the outer peripheral portion of the laser capillary 101 through the metallized layer 104, for causing cooling water to flow around the laser capillary 101; 109, a plurality of heat radiation fins consisting of copper and brazed on the pipe 110; 111, an inlet port of cooling water to the pipe 110; and 112, an outlet port of cooling water from the pipe 110.

As shown in FIGS. 1B and 1C, the pipe 110 has as true formed such that sections for forming a cooling water channel on the entire peripheral surface of the laser capillary 101 and a cooling water channel on part of the peripheral surface of the laser capillary 101 are alternately, repetitively arranged. Each of the plurality of heat radiation fins 109 is brazed on the section for forming the cooling water channel of the pipe 110 formed on part of the peripheral surface of the laser capillary.

In this embodiment, as shown in FIG. 1C, since the heat radiation fins 109 are partially in contact with the laser capillary 101 through portions which does not constitute the cooling channel of the pipe 110, even when both the air cooling unit and water cooling unit are used in the ion laser apparatus, an excellent air cooling effect can be obtained.

The positions of cooling water channels partially arranged on the outer peripheral portion of the laser capillary 101 are not always set in the state shown in FIG. 1C. The positions of the cooling water channels may be changed in units of the heat radiation fins to cause cooling water to meander or obliquely flow.

Figure 2A:
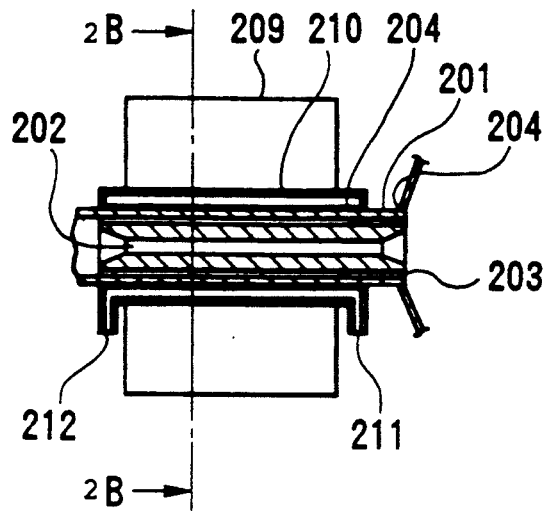
FIG. 2A is a sectional view showing the main part of an ion laser apparatus according to the second embodiment of the present invention.
Figure 2B:
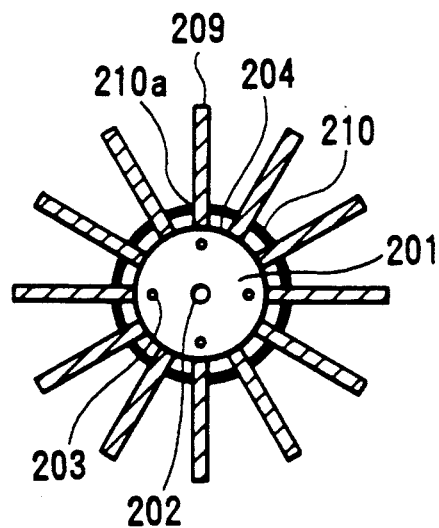
FIG. 2B is a sectional view showing the ion laser apparatus along a line 2B—2B in FIG. 2A.
Figure 3:
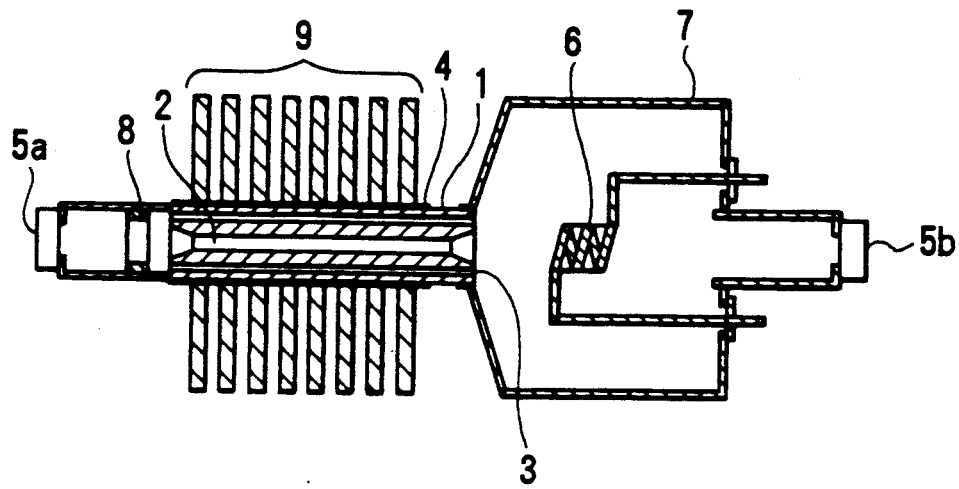
FIG. 3 is a sectional view showing a conventional ion laser apparatus.
Figure 4:
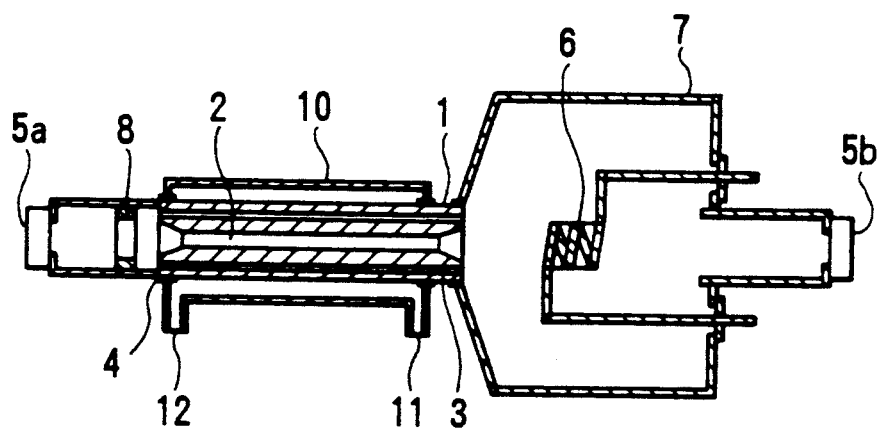
FIG. 4 is a sectional view showing a conventional ion laser apparatus.

FIG. 2A shows the main part of an ion laser apparatus according to the second embodiment of the present invention nd FIG. 2B shows the main part along a line 2B—2B in FIG. 2A. In FIGS. 2A and 2B, a description of the same parts as in the first embodiment in FIG. 1 is omitted.

As shown in FIGS. 2A and 2B, in this embodiment, a plurality of heat radiation fins 209 are brazed on a metallized layer 204 on a laser capillary 201 through through holes 210a formed in the surface of a pipe 210 at predetermined intervals nd the heat radiation fins are arranged parallel to the axial direction of the laser capillary 201. The pipe 210 coaxial with the laser capillary 201 is arranged outside the laser capillary 201. Therefore, a plurality of parallel cooling water channels are constituted by spaces each of which is formed by the adjacent two heat radiation fins 209, the laser capillary 201, and the pipe 210. The cooling water channels are connected to each other at both the end portions of the laser capillary 201 which have no partitions formed by the heat radiation fins 209. Cooling water is supplied from a common inlet port 211, and the cooling water is exhausted from a common outlet port 212. Reference numeral 202 and 203 denote a discharge path and a feedback path.

In this embodiment, since the heat radiation fins are in contact with the laser capillary 201 over its entire length, an air cooling effect which is more excellent than that of the first embodiment can be obtained.

In these embodiments, the internal mirror laser apparatuses have been described. However, the present invention is not limited to these embodiments, the present invention can be applied to a so-called external mirror laser apparatus having a pair of Brewster bulbs arranged at both the ends of the laser apparatus.

The laser apparatus of the present invention can be operated by selecting any one method from three types of cooling means, i.e., an air cooling method using an air cooling fan, a water cooling method for causing cooling water to pass through a channel, and a cooling method using both of the air cooling method and the water cooling method. Therefore, in the laser apparatus according to the present invention, when the third cooling method using both types of the cooling methods is employed, a laser beam having an output higher than that of a laser beam of the prior art can be obtained.

As described above, in an ion laser apparatus according to the present invention, air-cooled heat radiation fins and a cooling water pipe are arranged on a laser capillary. According to the present invention, one laser apparatus can be used as any one of an air-cooled laser apparatus and a water-cooled laser apparatus.

Therefore, according to the present invention, only one laser apparatus is satisfactorily used when ion laser apparatuses having both the cooling methods are required, thereby considerably decreasing cost in equipment. In addition, since manufacturers are only required to produce one type of laser apparatus, the laser apparatuses can be produced at low cost in mass production.

According to the present invention, since the air cooling method and the water cooling method are simultaneously performed to increase a cooling efficiency, a discharge current larger than that of the prior art can flow in the laser apparatus having the same size as that of the laser apparatus of the prior art. Therefore, a laser beam having an output higher than that of the laser beam of the prior art can be obtained.

What is claimed is:

1. An ion laser apparatus comprising:
   a laser tube including a laser capillary having a discharge path between an anode and a hot cathode and a feedback path for ian internal gas inside of:
   a pipe member constituting a cooling liquid channel for enabling a cooling liquid to flow between an outer peripheral surface of said laser capillary and an inner peripheral surface thereof in order to cool a said laser tube, the inner peripheral surface of said pipe member being in partial contact with the outer peripheral portion of said laser capillary; and
   air cooling heat radiation fins, fixed on an outer peripheral surface of said pipe member in correspondence with a contact portion between the inner peripheral surface of said pipe member and the outer peripheral surface of said laser capillary, or directly radiating heat, which is generated by said laser capillary, without requiring a heat transfer through the cooling liquid.

2. An apparatus according to claim 1, wherein said cooling channel comprises first portions each of said first portions being free of direct contact between the inner peripheral surface of said pipe member and the outer surface of said laser capillary, and second portions, each of said second portions having contact with the inner peripheral surface of said pipe member, said first and second portions being alternately arranged in an axial direction of said laser capillary, and said heat radiation fins are formed in a radial direction relative to said laser capillary and respectively arranged in units of said second portions in the axial direction of said laser capillary.

3. An apparatus according to claim 1, wherein said pipe member has through holes, said radiation fins extending through said through holes, and said heat radiations fins being directly mounted on the outer peripheral surface of said laser capillary via said through holes of said pipe member.

4. An apparatus according to claim 3, wherein said through holes are formed in said pipe member and extend along an axial direction of said laser capillary, and said heat radiation fins being formed in the axial direction of said laser capillary in correspondence with said through holes and arranged at predetermined intervals on the outer peripheral surface of said pipe member.

* * * * *